July 4, 1961 B. W. LEE 2,991,449

SELECTOR CIRCUIT

Filed Aug. 14, 1957 4 Sheets-Sheet 1

INVENTOR
B.W. LEE
BY
Harold C. Herman
ATTORNEY

INVENTOR
B. W. LEE
BY Harold P. Herman
ATTORNEY

July 4, 1961 B. W. LEE 2,991,449

SELECTOR CIRCUIT

Filed Aug. 14, 1957 4 Sheets-Sheet 3

INVENTOR
B. W. LEE
BY
Harold C. Herman
ATTORNEY

FIG. 6
ENABLING GATE
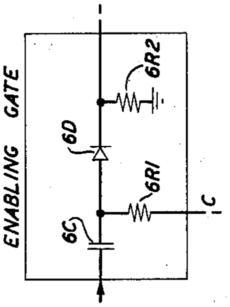
FIG. 7
INHIBITING GATE
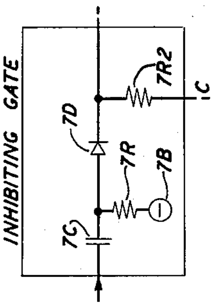
FIG. 5
FLIP-FLOP CIRCUIT
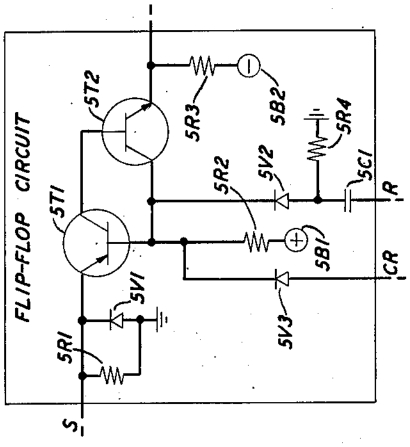
FIG. 8
GATE INVERTER
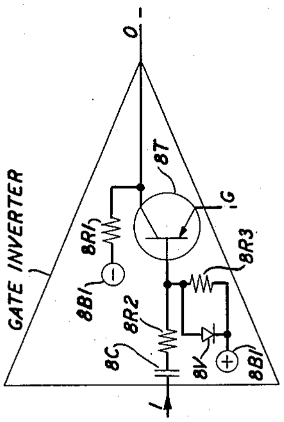
FIG. 4
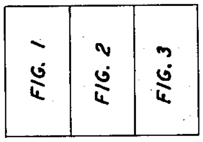
FIG. 9
| PREF | 1 | 2 | 3 | 4 | 5 | 6 |
|---|---|---|---|---|---|---|
| VG NO. | TRUNK NO. | | | | | |
| 0 | 3 | 2 | 1 | 0 | 8 | 9 |
| 1 | 6 | 7 | 0 | 1 | 8 | 9 |
| 2 | 2 | 3 | 4 | 5 | 8 | 9 |
| 3 | 0 | 1 | 2 | 3 | 8 | 9 |
| 4 | 4 | 0 | 5 | 1 | 8 | 9 |
| 5 | 6 | 4 | 7 | 5 | 8 | 9 |
| 6 | 5 | 7 | 4 | 6 | 8 | 9 |
| 7 | 1 | 5 | 0 | 4 | 8 | 9 |
| 8 | 2 | 6 | 3 | 7 | 8 | 9 |
| 9 | 7 | 3 | 6 | 2 | 8 | 9 |
INVENTOR
B.W. LEE
BY
Harold C. Herman
ATTORNEY United States Patent Office 2,991,449

Patented July 4, 1961

2,991,449

SELECTOR CIRCUIT

Bock W. Lee, New York, N.Y., assignor to Bell Telephone Laboratories, Incorporated, New York, N.Y., a corporation of New York Filed Aug. 14, 1957, Ser. No. 678,134
13 Claims. (Cl. 340—147)

This invention relates to a selector circuit and more particularly to a high speed selector circuit which establishes a flexible selection preference.

In many systems, such as telephone systems, switching systems and computer systems, it is often necessary to select one of a number of available selectable elements in accordance with a definite preference pattern and then to supply an indication of the selection. For example, in the line concentrator telephone system disclosed in United States Patent No. 2,812,385 which was granted to Joel-Krom-Posin on November 5, 1957, an idle trunk is selected for establishing a connection to a subscriber line. The selected trunk is the preferred idle trunk connectable to the subscriber line. Not all of the trunks are connectable to each subscriber line and the trunk preference is different for different lines. The trunk preference is different for different lines in order to distribute the traffic load among all the trunks.

A general object of this invention is to provide a high speed selector circuit which establishes a preference for selecting available selectable elements.

A more specific object of this invention is to provide a high speed selector which establishes a flexible selection preference in that the selection preference varies in accordance with the selection request. The selector circuit of this invention could be utilized, therefore, in the line concentrator system of the type disclosed in the above-identified patent granted to Joel-Krom-Posin to select an idle preferred trunk connectable to one of the subscriber lines.

In accordance with an illustrative embodiment of this invention, a high speed selector circuit is disclosed which has a number of stages connected in a chain. Each stage includes a flip-flop circuit and two enabling gate circuits. One of the gate circuits associated with each of the flip-flop circuits is controlled in accordance with the availability of one of a number of selectable elements. A translation network translates the identity of the available element into its preference location for the specific selection request. There are a number of selection requests which control the translator network, and a different preference selection is established for the selectable elements for each selection request.

A feature of this invention relates to the translation network which is associated with the selectable elements and which provides for the flexible selection preference. If the high speed selector circuit of this invention is utilized for selecting a trunk in a system of the type described in the above-identified patent granted to Joel-Krom-Posin, the trunks would be the selectable elements and a busy trunk would provide for enabling one of the gate circuits associated with the flip-flop circuits. The translator network determines which one of the gate circuits is enabled.

The enabled gate circuits connect the flip-flop circuits in a preference chain with the first flip-flop circuit being the first preferred, the second flip-flop circuit being the second preferred, etc. If the fourth selectable element is the first preferred element for the particular selection request and it is available for selection, it disables the first gate circuit to break the chain of flip-flop circuits between the first and the second flip-flop circuit. The identity of the first available order of preference is thereafter determined by providing an input pulse to the first flip-flop circuit in the chain. The gate circuits enabled by the unavailable selectable elements function together with the flip-flop circuits to form a self-propagating chain. With the chain effectively broken after the first flip-flop circuit, the self-propagation is halted thereat. In the chain, each flip-flop circuit triggers the next flip-flop circuit through the enabled gate circuit and resets the preceding flip-flop circuit.

Another object of this invention is to provide a positive advance selector, and a feature of this invention relates to the means for establishing a positive propagation advance. The positive advance is provided by not setting any one of the flip-flop circuits unless its first preceding flip-flop circuit is set and its second preceding flip-flop circuit is turning off. The positive advance feature insures that two flip-flop circuits do not remain operated in the chain to indicate the selection of two of the selectable elements.

With the order of preference selection established, a preference translation is performed to determine the identity of the selectable element for the particular selection request.

Still another feature of this invention pertains to the double translation: the first to translate the identities of the selectable elements to their orders of preference for the particular request in order to determine the preferred available order; and the second to translate the preferred available order back to the selectable element identity in order to provide a pulsed indication thereof. The double translation provides for the flexible preference.

After the preference selection is completed, a second set of gate circuits individually associated with the flip-flop circuits functions therewith as a shift register circuit having a step-by-step operation to provide a number of pulses which identifies the selected element. Before the flip-flop circuits are utilized in this manner they are reset and the identity of the selected element is supplied thereto.

A further feature of this invention relates to gating means associated with a set of flip-flop circuits for establishing a flexible preference selection and thereafter for generating pulses indicating the identity of the selection.

Another feature of this invention relates to gating means associated with said flip-flop circuits for preventing the operation of any of said flip-flop circuits when a common reset pulse is provided thereto.

Further objects and features will become apparent upon consideration of the following description taken in conjunction with the drawing wherein:

FIGS. 1, 2 and 3, when arranged in accordance with FIG. 4, are a circuit representation of the selector circuit of this invention;

FIG. 4 illustrates the arrangement of FIGS. 1, 2 and 3;

FIG. 5 is a circuit representation of the flip-flop circuit utilized in the selector circuit of this invention;

FIG. 6 is a circuit representation of the enabling gate circuit utilized in the selector circuit of this invention;

FIG. 7 is a circuit representation of the inhibiting gate circuit utilized in the selector circuit of this invention;

FIG. 8 is a circuit representation of the gate-inverter utilized in the selector circuit of this invention; and FIG. 9 is a table illustrating the preference selection for each of the vertical group relays.

Figure 1:
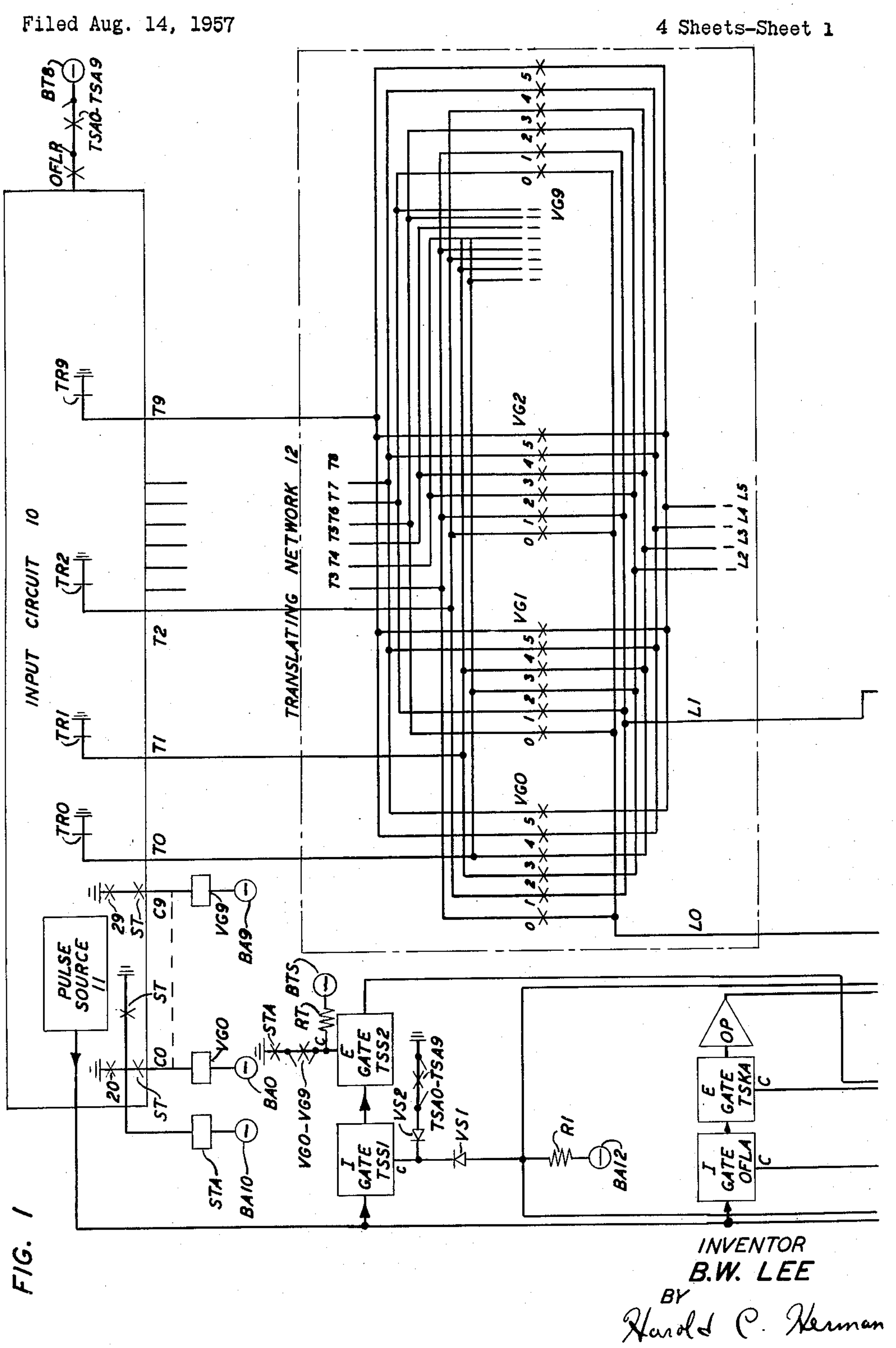
Figure 2:
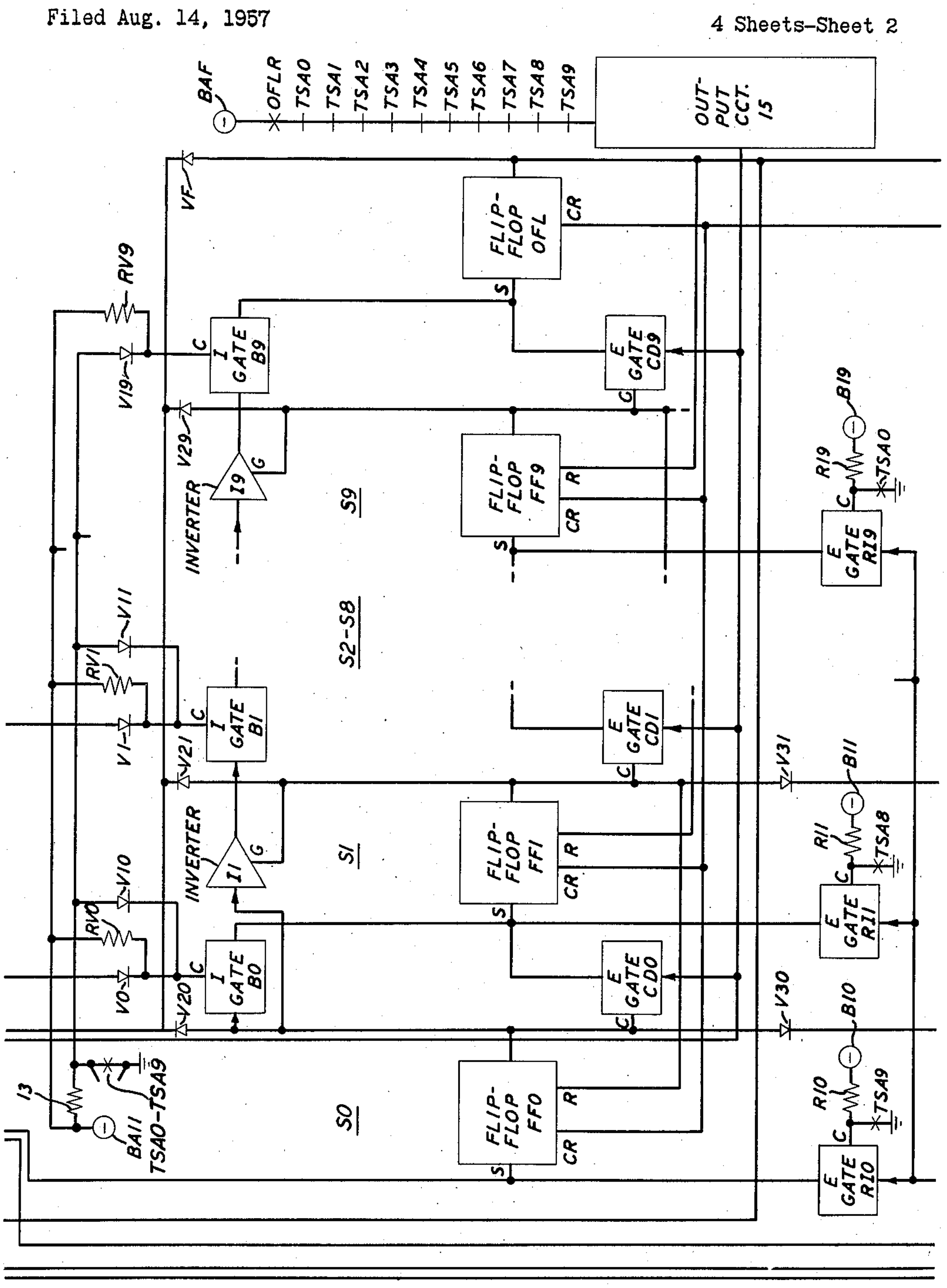
Figure 3:
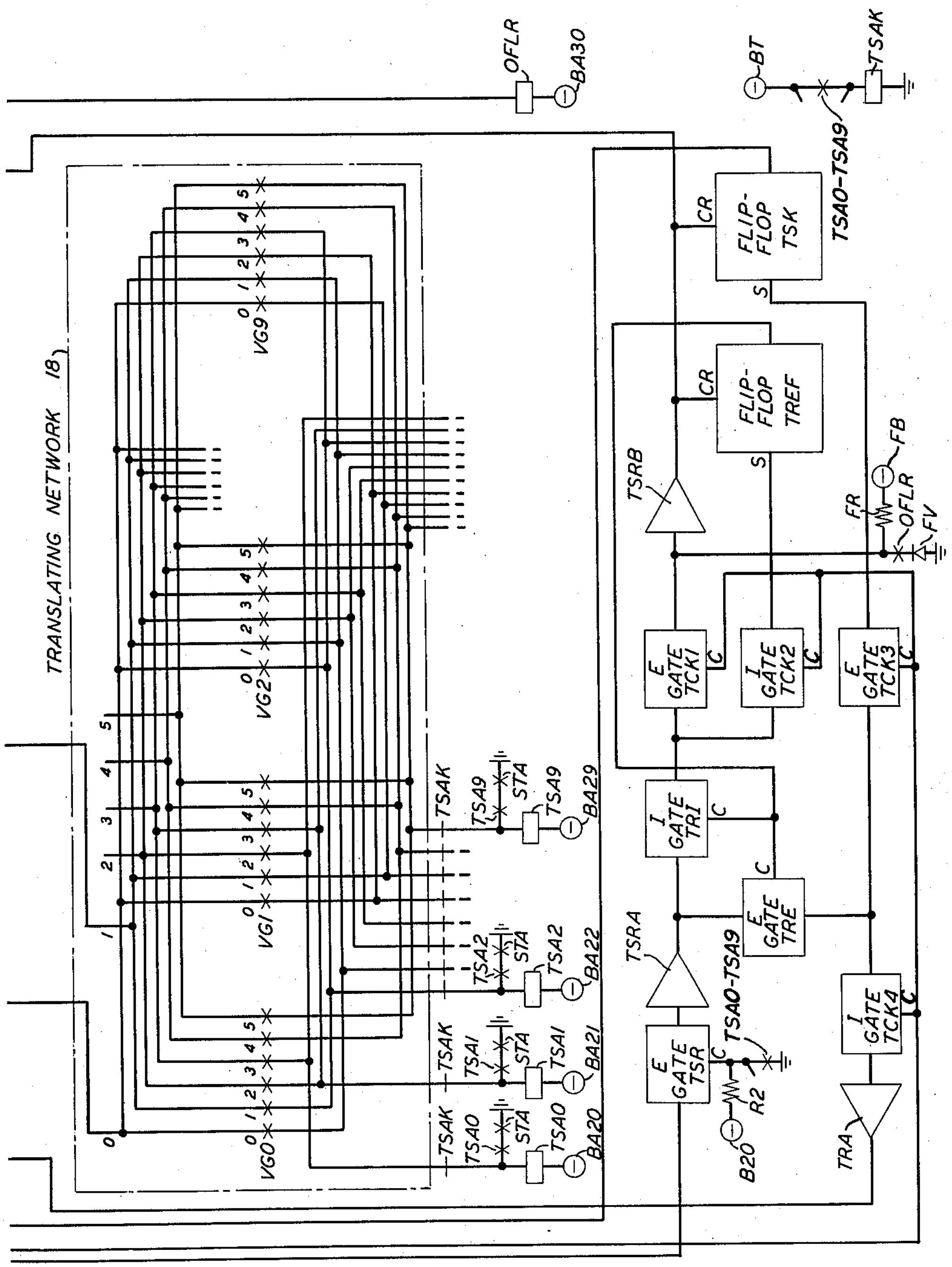

In the selector circuit shown in FIGS. 1, 2 and 3, when arranged in accordance with FIG. 4, the relay contacts are shown detached from the relay windings. Contacts which are closed when the relay is deenergized are represented by a single short line perpendicular to the line representing the connecting conductor, while contacts which are closed when the relay is operated are represented by an X crossing the connecting conductor. The same designation is utilized for the relay winding and for the relay contacts.

Referring to FIGS. 1, 2 and 3, when arranged in accordance with FIG. 4, the high speed selector circuit of this invention includes 11 stages S0–S9 and OFL (FIG. 2) which are connected in a chain. Only the stages S0, S1 and S9 and OFL are shown as stages S2–S8 are identical with the stages S1 and S9. The stages S0–S9 include, respectively, the bistable flip-flop circuits FF0–FF9, the enabling gates B0–B9, the enabling gates CD0–CD9 and the enabling gates RI0–RI9. All these circuits and gates are hereinafter described. In addition to these circuits the stages S1–S9 include, respectively, the gate-inverters I1–I9 which are also hereinafter described.

The stages S0–S9 and OFL function in two separate sequences of operation to first select an idle preferred selectable element, not shown, and then to supply a pulsed indication thereof. The operation of the stages S0–S9 for these sequences is controlled by an input or control circuit 10. The input circuit 10 includes a pulse source 11, ten selection request contacts 20–29, a number of start contacts ST and ten contacts TR0–TR9 which are controlled in accordance with the availability of ten associated selectable elements, not shown. The selectable elements may, for example, be trunks in a telephone system of the type described in the above-identified patent granted to Joel-Krom-Posin. If a selectable element, or trunk, is available for selection, or is idle, its associated one of the contacts TR0–TR9 is normal. When a trunk is busy and therefore unavailable for selection, a path to ground through its associated one of the contacts TR0–TR9 is opened. The normal contacts TR0–TR9 connect ground to a translating network 12 which, as hereinafter described, determines the order of preference for selecting the trunks or selectable elements. The translating network 12 is controlled from the input circuit 10 by means of the start contacts ST and the selection request contacts 20–29.

When the selection of one of the selectable elements is required, one of the contacts 20–29 is closed and the start contacts ST of a start relay, not shown, are closed. The means for closing these contacts may be manual or automatic and may include central office telephone common control equipment or the like. The input circuit 10 includes the means for closing the start contacts ST.

The operation of the start relay indicates that a selection sequence is to commence, and the closing or operation of one of the contacts 20–29 identifies the requesting source. The request for a trunk or element may originate at any one of ten sources which are identified by the operation of one of the contacts 20–29. As is hereinafter described, the preference for selecting the trunks is determined by which one of the contacts 20–29 is operated. Each of the requesting sources and its associated contact has a different preference selection. In the above-identified patent granted to Joel-Krom-Posin, the requesting sources are subscriber lines which are divided into groups of lines referred to as vertical groups. Each vertical group of lines has a different trunk preference in order to distribute the traffic load.

The contacts 20–29 are associated individually with ten group relays VG0–VG9 which are connected respectively to the batteries BA0–BA9. When the start contacts ST of the start relay and one of the contacts 20–29 are closed, a path is provided from ground to operate that one of the relays VG0–VG9 associated with the closed contact and an operating path is completed for the start relay STA. The winding of the start relay STA is connected between the battery BA10 and one of the grounded start contacts ST in the circuit 10. Assume by way of example that contact 20 is closed so that relay VG0, associated therewith, is operated. When relay VG0 operates, it enables an enabling gate TSS2 and it operates the translating networks 12 and 18. The enabling path is from ground through the closed contact STA and a closed contact of relay VG0 to the control terminal C of the enabling gate TSS2.

Referring to FIG. 6, the enabling gate TSS2 is a three-terminal device which normal functions to prevent the passage of pulses appearing at its input terminal. The input terminal of the enabling gate is connected through the serially connected capacitor 6C and varistor 6D to its output terminal. The varistor 6D is normally reversed biased by a minus 18-volt potential appearing at terminal C. As shown in FIG. 1, terminal C of the enabling gate TSS2 is connected through the resistor RT to the minus 18-volt battery BTS. Referring again to FIG. 6, the control terminal C of the enabling gate is connected through the resistor 6R1 to the junction between the capacitor 6C and the varistor 6D. The other terminal of the varistor 6D is connected to the grounded resistor 6R2. Normally, therefore, the varistor 6D is reversed biased by the minus 18-volt potential appearing at the control terminal C. When the potential at the control terminal C increases from minus 18 volts to ground potential, the varistor 6D becomes bero biased to allow the passage of positive pulses appearing at the input terminal of the enabling gate.

The enabling gate TSS2 is part of a path from the pulse source 11 in the input circuit 10 to the input terminal S of the flip-flop circuit FF0 in the stage S0. When the gate TSS2 is enabled the path from the pulse source 11 through the inhibiting gate TSS1 and the enabling gate TSS2 to the stage S0 is completed.

The inhibiting gate TSS1 is a three-terminal device which normally functions and allows the passage of pulses appearing at its input terminal. As shown in FIG. 7, the input terminal of the inhibiting gate is connected through the capacitor 7C and the varistor 7D to the output terminal. The varistor 7D is normally zero biased or slightly back biased by the minus 18-volt battery 7B which is connected by the resistor 7R to the junction between the capacitor 7C and the varistor 7D. The output terminal of the gate is connected to the control terminal C through the resistor 7R2. Normally, the varistor 7D is zero biased by the connection of a minus 18-volt source to terminal C. Referring to FIG. 1, the minus 18-volt source BA12 is connected through the resistor R1 and the varistor VS1 to the control terminal C of the inhibiting gate TSS1. With a relatively negative potential at the control terminal C, varistor 7D allows the passage of positive pulses appearing at the input terminal of the gate.

The pulse source 11 continuously supplies positive pulses at a rate of 500 pulses per second to the gate TSS1. With the gates TSS1 and TSS2 allowing the passage of pulses, a pulse is supplied from the source 11 to the set terminal S of the stage S0. As is hereinafter described, the pulse from the source 11 functions to initiate a self-propagation sequence of operations which results in the selection of the preferred available element.

As indicated above, when relay VG0 operates, it also completes paths through the translator networks 12 and 18. The translator network 12, which is the information input for the stages S0–S5, functions to translate the trunk or element identity to the preference order therefor, and the network 18, which is the information output for the stages S0–S9, performs the reverse translation.

The paths through the translating network 12 are from the contacts TR0–TR9 in the input circuit 10 through the leads T0–T9 to the leads L0–L5. As described above, the contacts TR0–TR9 are normal to connect ground to the network 12 when their associated trunks are idle and are operated to open ground when their associated trunks or elements are busy. Suppose, by way of example, that contacts TR3–TR7 are open, or operated, and contacts TR0–TR2 and TR8–TR9 are closed, or normal to indicate that the elements 3–7 are unavailable and the elements 0–2 and 8–9 are available. With contacts TR0–

TR2 and TR8–TR9 closed, ground is provided on leads T0–T2 and T8–T9 to the network 12. The operation of one of the relays VG0–VG9 functions to connect six of the leads T0–T9 individually to the six preference leads L0–L5. Only six of the trunks are considered for selection during each selection sequence. The table shown in FIG. 9 illustrates which trunks are considered and also the preference for selecting the considered trunks for each of the vertical group relays VG0–VG9.

A trunk or selectable element which happens to have a first preference for a particular selection source or vertical group may have third or even fourth preference for another vertical group. For example, trunk No. 3 which has first preference for vertical group 0 has only second preference for vertical groups 2 and 9, third preference for vertical group 8, fourth preference for vertical group 3 and is not even accessible to the other vertical groups. There is no consistent relation between trunk members and the order of preference in which trunks accessible to a vertical group should be selected.

With the selection request being from the source associated with contact 20 in the circuit 10, contact 20 is closed. With contact 20 closed, relay VG0 is operated and paths are closed through the network 12 for leads TR0–TR3 and TR8–TR9 but not for leads TR4–TR7. As indicated in FIG. 9, the six trunks 0–3 and 8–9 are considered when relay VG0 is operated and the selection preference is in the following order: 3, 2, 1, 0, 8 and 9. In other words, the first preferred trunk is trunk 3, the second preferred trunk is trunk 2, etc. With contact 20 operated, trunk 3 is selected if it is idle.

In the example being described it was assumed that trunks 0–2, 8 and 9 are idle and trunks 3–7 are busy. As is hereinafter described, with the first preferred trunk 3 busy, the second preferred trunk 2, which is idle, is selected.

When relay VG0 operates, it connects lead T3 to lead L0, lead T2 to lead L1, lead T1 to lead L2, lead T0 to lead L3, lead T8 to lead L4 and lead T9 to lead L5. With leads T0–T2 and T8–T9 grounded, leads L1, L2, L3, L4 and L5 are grounded but not lead L0. Lead L0 is not grounded to indicate that the preferred element or trunk is unavailable for selection. The leads L0–L5 are connected respectively to the control terminals C of the inhibiting gates B0–B5. A ground potential at terminal C of any one of the gates B0–B5 functions to inhibit or block the passage of pulses.

Normally a negative potential from the minus 24-volt source BA11 functions to enable the gates B0–B9. The source BA11 is connected respectively through the resistors RV0–RV9 and also through the resistor 13 and the varistors V10–V19 to the control terminals C of the gates B0–B9. When a control terminal C is grounded, the gate inhibits the passage of positive pulses appearing at the input terminal of the gate.

The output terminal of each of the gates B0–B9 is connected to the input terminal of the flip-flop circuit in the next stage. For example, the output terminal of the gate B0 in stage S0 is connected to the set terminal S of the flip-flop circuit FF1 in stage S1. The output terminal of each of the flip-flop circuits FF1–FF9 is connected through an associated gate-inverter I1–I9 to the input terminal of the associated one of the gates B1–B9. For example, the output terminal of the circuit FF0 is connected through the gate-inverter I1 to the input terminal of the gate B1. The gate-inverters I1–I9 and the circuits FF0–FF9 are hereinafter described in detail. The output terminal of the flip-flop circuit FF0 is connected directly to the input terminal of the gate B0. In this manner, the circuits FF0–FF9 and OFL, the gates B0–B9 and the gate-inverters I1–I9 together form a propagation chain. If all the gates B0–B9 are enabled to permit the passage of pulses, a positive pulse to the set terminal S of the circuit FF0 will cause the circuits FF0–FF9 and OFL to successively trigger or operate.

As described above, at the same time that the translating network 12 is operated by relay VG0, relay VG0 also enables the gate TSS2 to complete a path from the pulse source 11 to the circuit FF0. When the gate TSS2 is enabled, a positive pulse is provided from source 11 through the gates TSS1 and TSS2 to the set terminal S of circuit FF0. The gate TSS1 is disabled after the passage of the first pulse to block subsequent pulses so that only a single pulse is provided from the source 11 to the stage S0. The gate TSS1 is disabled because its control terminal C is connected through the varistor VS1 and the varistors V20–V29, respectively, to the output terminals of the circuits FF0–FF9 and OFL. As long as all of the circuits FF0–FF9 and OFL are normal, the gate TSS1 remains enabled but when any one of the circuits FF0–FF9 and OFL is set, it disables the gate TSS1.

As shown in FIG. 5, each of the flip-flop circuits FF0–FF9 and OFL includes a PNP junction transistor 5T1 and a NPN junction transistor 5T2 interconnected in a hook arrangement to provide for a current amplification factor greater than one. Such hook arrangements are described, for example in the Patent 2,655,609 which was issued to W. Shockley on October 13, 1953. The set terminal S is connected to the emitter electrode of the transistor 5T1 and also to ground through the varistor 5V1 and the resistor 5R1. The varistor 5V1 functions to shunt negative pulses to ground and the resistor 5R1 functions to bias the emitter electrode of the transistor 5T1 with respect to its base electrode. The base electrode of transistor 5T1 is connected to the plus 6-volt potential source 5B1 through the feedback promoting resistor 5R2.

The flip-flop circuits FF0–FF9 and OFL are bistable circuits having a low and a high current equilibrium condition. A positive pulse at the set terminal S triggers the flip-flop circuit to its high current equilibrium condition where it remains until a positive pulse is provided to its common reset terminal CR or to its reset terminal R. The common reset terminal CR is connected through the varistor 5V3 to the base electrode of the transistor 5T1 and the reset terminal R is connected through the capacitor 5C1 and the varistor 5V2 to the base electrode of the transistor 5T1. The junction between the varistor 5V2 and the capacitor 5C1 is connected to the grounded resistor 5R4.

In the low current equilibrium condition, the transistors 5T1 and 5T2 present a high impedance between the emitter electrode of transistor 5T2 and the base electrode of transistor 5T1 so that the potential at the output terminal of the flip-flop circuit is at minus 18 volts due to its connection through the resistor 5R3 to the minus 18-volt potential source 5B2. When the flip-flop circuit is triggered to its high current equilibrium condition, the transistors 5T1 and 5T2 form a low impedance path from the battery 5B1 so that the output potential increases.

The present invention is of course not restricted to the particular flip-flop circuit or gates described herein but contemplates any other similar functioning circuits and gates. For example, the flip-flop circuits described in the pending patent applications Serial No. 654,604, filed by B. W. Lee on April 23, 1957, now Patent No. 2,958,789, Nov. 1, 1960, and Serial No. 622,646, filed by Abbott-Sumner on November 16, 1956, may be utilized.

When the positive pulse is provided from the source 11 through the gates TSS1 and TSS2, it functions to set the flip-flop circuit FF0. When the circuit FF0 is triggered or set, it provides a positive pulse through the inhibiting gate B0 to the set terminal S of the flip-flop circuit FF1 and, as described above, it disables the gate TSS1. The gate B0 is enabled because the preferred trunk or element 3 is unavailable for selection. The positive pulse at the set terminal S of the flip-flop circuit FF1 causes it to trigger to its high current condition. When the circuit FF1 is triggered to its high current condition it provides a positive pulse to the reset terminal R of the flip-flop circuit FF0 causing it to reset and it also provides a positive pulse to the gating terminal G of the gate-inverter I1. The gate-inverter I1 is serially connected with the inhibiting gate B1 between the flip-flop circuits FF0 and FF2. A positive pulse is provided from the gate-inverter I1 to the circuit FF2 if the circuit FF1 is at its high current condition and the circuit FF0 is in the process of turning off from its high current condition.

As shown in FIG. 8, each of the gate-inverters I1–I9 is a common emitter amplifier employing a single PNP junction transistor 8T which provides for gain, inversion and gating action. The gating terminal G is connected to the emitter of transistor 8T and the input terminal of the gate-inverter is connected through the coupling capacitor 8C and resistor 8R2 to the base of transistor 8T. The base of transistor 8T is connected to plus 6-volt battery 8B1 through a varistor 8V and a resistor 8R3. The output of the gate-inverter is taken directly from the collector of transistor 8T which is connected through resistor 8R1 to the minus 18-volt battery 8B2. A positive pulse appears at the output terminal as the result of a combination of inputs at the gating terminal G and the input terminal.

As described above, the terminal G is connected to the first preceding flip-flop circuit in the selection chain and the input terminal is connected to the second preceding flip-flop circuit in the selection chain. For example, the terminal G of the gate-inverter I1 is connected to the output terminal of the circuit FF1 and the input terminal of the gate-inverter I1 is connected to the output terminal of the circuit FF0. Normally all the flip-flop circuits FF0–FF9 and OFL in the chain are at their low current or off condition so that the potential normally applied to the terminal G and hence to the emitter of the PNP transistor 8T is minus 18 volts. Under this condition the PNP transistor 8T cannot conduct regardless of the condition at the input terminal of the gate-inverter since both the collector and emitter are at the same minus 18-volt potential. However, when the flip-flop circuit, to which terminal G is connected, is turned on or set the applied potential at the terminal G changes to approximately minus 1 volt to allow the transistor 8T to conduct if a negative pulse is applied to the base of the transistor 8T. The transistor 8T does not conduct merely due to the change in potential at terminal G because the emitter-to-base junction remains reverse biased by minus 7 volts. A negative pulse greater in magnitude than 7 volts at the base of transistor 8T will cause it to conduct.

The negative pulse to the input of a gate-inverter is derived from the second preceding flip-flop circuit when it turns off. The second preceding circuit is normally off just as are the other circuits in the chain so that the applied potential at the input terminal of the gate-inverter is normally minus 18 volts. When the second preceding flip-flop circuit is turned on, the output potential changes to minus 1 volt to provide a positive pulse through the capacitor 8C of 17 volts. This potential change through the capacitor 8C does not produce an output from the gate-inverter because it only tends to further reverse bias the emitter-to-base junction.

The second preceding flip-flop circuit remains on for only approximately 15 microseconds if accessible trunk conditions are such as to require further propagation down the selection chain. For example, in the example being described with trunk 3 busy, the flip-flop circuit FF0 is turned on and then reset by the circuit FF1 after approximately 15 microseconds. During this 15-microsecond interval the capacitor 8C in the gate inverter I1 must be discharged if the gate inverter I1 is to respond to the negative-going edge of the pulse from the circuit FF0 when it turns off. To insure the complete discharge of the capacitor 8C, a low impedance discharge path is provided through the varistor 8V to battery 8B1. The complete discharge of the capacitor 8C takes place in approximately 2 to 3 microseconds after the second preceding flip-flop circuit is turned on. When the second preceding flip-flop circuit turns off, a negative-going pulse is provided through the capacitor 8C of 17 volts to reduce the potential at the base of transistor 8T. The resulting flow of emitter current through the transistor 8T produces a positive pulse of approximately 17 volts at the output of the gate-inverter. The duration of the output pulse depends upon the length of time conduction is maintained through the transistor 8T which is in turn determined by the time constant of the coupling capacitor 8C and the resistance of its charging path. In the illustrative embodiment being described the duration of the output pulse is approximately 10 microseconds.

When the circuit FF0 turns off or returns to its low current condition, the 10-microsecond positive pulse is provided from the gate-inverter I1 to the gate B1. As described above, however, the inhibiting gate B1 does not allow the passage of pulses appearing at its input terminal to indicate that the second preferred trunk 2 is idle. The gate B1 therefore blocks the pulse to the flip-flop circuit FF2 to halt the propagation. Since the circuit FF2 is not set, the flip-flop circuit FF1 remains set to indicate that the second preferred element is the first preferred available element.

The reason for utilizing the gate-inverters I1–I9 in the propagation chain is to insure positive propagation advance. By positive propagation advance is meant that a given stage cannot be turned on if it is possible for a preceding stage in the propagation chain to remain set or passed over. If a stage is passed over and not reset as the propagation down the chain proceeds, two elements instead of one are selected.

In the absence of the positive advance feature, it is possible for a first stage to turn on the next stage which resets the first stage before the first stage resets the stage preceding it. This possibility exists because of the variation of the turn-off time of the flip-flop circuits FF0–FF9. The turn-off time of a flip-flop circuit is dependent upon the storage-time delays of the transistors utilized in the circuit. The storage time delay is the time required to initiate current reduction through a saturated transistor. With ordinary junction transistors the turn-off time of the flip-flop circuit can vary from 2 to 10 microseconds. The turn-on time on the other hand is very short, usually less than 1 microsecond.

Suppose, for example, that the circuit FF1 has a turn-off time of 2 microseconds and the circuit FF0 has a turn-off time of 10 microseconds. If the positive advance feature is not utilized with the circuit FF2 providing a set pulse through gate B2 to circuit FF3 as well as a reset pulse to circuit FF1, the circuit FF1 will reset before the circuit FF0 resets. When circuit FF1 resets, it removes the reset potential from circuit FF0 leaving it set as the propagation proceeds through the rest of the chain. The circuit FF0 remains set because it requires a reset pulse having a duration of 10 microseconds and it receives a reset pulse of only 3 microseconds; one to turn on or set the circuit FF2 plus two to reset the circuit FF1.

The positive advance feature, utilizing the gate-inverters I1–I9 removes the possibilty of a double selection due to the failure of resetting one of the circuits FF0–FF9 during the selection sequence.

The output terminals of the flip-flop circuits FF0–FF5 are connected to the translator network 18 which includes contacts of the relays VG0–VG9. The translator network 18 functions to translate the selected preference order to the trunk identity which is the reverse translation performed by the translator network 12. With the propagation halted at stage S1, a relatively positive potential is provided through the varistor V31, contact 1 of relay VG0 in the network 18 to the winding of a relay TSA2. There are ten relays TSA0–TSA9 which identify, respectively, the ten selectable elements in the input circuit 10. The translation through the translating network 12 to the stages S0–S9 was from the selectable element 2 to its preference order for the particular vertical group 0, as indicated by the operation of relay VG0. The preference order, as described above, was 1 as indicated by the propagation halting at stage S1. The windings of the relays TSA0–TSA9 are connected on one side to the translating network 18 and on the other side, respectively, to the negative batteries BA20–BA29. When the relay TSA2 operates, it locks to ground through its contact and a contact of the relay STA.

During the selection or propagation sequence, the flip-flop circuits that are set and reset do not remain on long enough to operate one of the relays TSA0–TSA9. A stage is passed over during the selection of sequences in approximately 15 microseconds whereas the relays TSA0–TSA9 require a minimum of approximately 1 millisecond for operation. After the selection has been completed and the flip-flop circuit remains set, the corresponding relay is operated. Only one of the relays TSA0–TSA9 is therefore operated during the selection sequence.

The selector circuit is ready to proceed with the outpulsing sequence of operations as soon as the selected relay TSA2 is locked operated. When the relay TSA2 operates, it provides an additional inhibition potential to the gate TSS1 by connecting ground through the diode VS2 to the control terminal C of gate TSS1. As described above, the gate TSS1 is inhibited by the circuits FF0–FF9 and OFL as long as one of them is set. The circuits FF0–FF9 and OFL control the condition of the gate TSS1 as their output terminals are multiplied through the varistors V20–V29 and VF to a varistor VS1 which is connected to the control terminal C of the inhibiting gate TSS1. As long as any one of the circuits FF0–FF9 and OFL is set a control inhibiting potential is provided to the gate TSS1. In this manner, as soon as the flip-flop circuit FF0 is set during the selection or propagation sequence it inhibits the gate TSS1 to block other start pulses from the source 11. Only one pulse is therefore provided from the source 11 to the circuit FF0. The relay TSA2 functions to provide an additional inhibition potential to the gate TSS1 because the circuit FF1 which remains set after the selection sequence is thereafter reset during the outpulsing sequence and it is necessary to continue the inhibition of pulses to the circuit FF0.

Before proceeding with a description of the outpulsing sequence of operations which begins when relay TSA2 operates, consider a selection sequence with all trunks busy or all elements unavailable for selection. If none of the six selectable elements is available for the requesting vertical group selection, the six associated contacts of the ten contacts TR0–TR9 are operated and all ten gates B0–B9 remain enabled during the selection sequence. If a selectable element is not one of the six associated with the group, it is immaterial whether it is available or not as the last four gates, gates B6–B9 are always enabled during the selection sequence. The gates B6–B9 are always enabled because only six elements are considered for each selection request. With all ten gates B0–B9 enabled, a start pulse from source 11 to the set terminal S of the flip-flop circuit FF0 causes the ten circuits FF0–FF9 to be successively set and thereafter reset. The start pulse in this manner triggers the ten-stage self-propagation chain if all selectable elements for the particular vertical group are unavailable. When the stage FF9 at the end of the chain is set, it in turn sets the flip-flop circuit OFL. When the flip-flop circuit OFL is set, it resets FF9 and operates a relay OFLR the winding of which is connected to battery BA30. When relay OFLR operates, it provides an overflow indication from battery BAF through its operated contact and the serially connected normal contacts of relays TSA0–TSA9 to the output circuit 15. The circuit OFL therefore functions during the selection sequence to provide an indication that all the selectable elements are unavailable for selection. As is hereinafter described, the circuit OFL functions during the outpulsing sequence to terminate the pulse generation.

Returning to the outpulsing sequence, the stages S0–S9 are utilized to provide a pulsed indication of the identity of the selected element utilizing the flip-flop circuits FF0–FF9 and OFL and the enabling gates CD0–CD9. The circuits FF0–FF9 and OFL and the gates CD0–CD9 form a shift register for providing a number of pulses which indicate the numerical designation of the selected element. In the example described above, the numerical designation of the selected element is 2.

In general, a shift register consists of a series of bistable circuits which are interconnected so that a shift or timing pulse applied simultaneously to each circuit causes the information stored in one circuit to transfer or shift to the next succeeding circuit. The shift or timing pulses are provided in the illustrative embodiment from the pulse source 11 which, as described above, is a continuously operating pulse generator.

When relay TSA2 operates, it performs the following functions:

(1) It provides a self-locking path as described above;

(2) It supplies ground potential to the inhibiting gate TSS1 to maintain it inhibited during the outpulsing sequence also as described above;

(3) It inhibits all ten gates B0–B9;

(4) It operates the relay TSAK;

(5) It enables the gate TSR to ready a path for resetting the flip-flop circuit FF1 in stage S1; and (6) It enables the gate R17 to ready a path for setting the flip-flop circuit FF7 for the outpulsing sequence of operation. The number of pulses that is to be outpulsed is equal to the select element number plus 1. One pulse is required to identify the element 0, two pulses for the element 1, and so forth, with a maximum of ten pulses being required for element 9. The circuit FF7 is set so that three pulses will be provided to the output circuit 15 during the outpulsing sequence.

The disabling potential is provided to the control terminal C of the gates B0–B9 from ground through the operated contact of relay TSA2 and the varistors V10–V19. The inhibition of the gates B0–B9 allows the stages S0–S9 to function as a shift register instead of as a self-propagating selection chain. If gates B0–B9 are not inhibited the self-propagation feature remains effective during outpulsing.

Relay TSA2 operates the relay TSAK by connecting the battery BT thereto. When relay TSAK operates, it opens the operating paths from the translating network 18 to the windings of the relays TSA0–TSA9. Relay TSA2, however, remains operated due to its locking path to ground through the operated contact of the start relay STA. The operating paths for the relays TSA0–TSA9 are open to prevent their operation during the outpulsing sequence of operations.

The stage FF1, which remains set after the selection sequence, corresponds to the assigned preference of the selected element for the given selection source and does not have a fixed relationship with the selected element number. Before the shifting sequence of operations commences, the preference number is erased from the stages S0–S9 and the element or trunk number is read in. The resetting and read-in function is initiated when relay TSA2 operates and enables the gate TSR.

When relay TSA2 operates, it connects ground to the control terminal C of the enabling gate TSR in FIG. 3. The control terminal C of gate TSR is normally at a minus 18-volt potential due to its connection through the resistor R2 to the minus 18-volt potential source B20. When the gate TSR is enabled, the next pulse from the pulse source 11 is passed through the gate TSR, the amplifier TSRA, the inhibiting gate TRI, the enabling gate TCK1 and the amplifier TSRB to the reset terminals CR of the flip-flop circuits TREF, TSK, OFL and FF0–FF9. When the gate TSR is enabled, therefore, a reset pulse is provided to all of the flip-flop circuits to insure their normal condition and to reset the selected flip-flop circuit FF1 in the chain. The gate TCK1 is enabled at this time and the inhibiting gate TCK2 is disabled because a control potential is provided thereto as long as one of the circuits FF0–FF9 and OFL is operated. A control potential is provided from the circuit FF1 through the varistor V21 to the terminals C of the gates TCK1–TCK4. Each of the circuits FF0–FF9 and OFL is connected to the control terminals C of the gates TCK1–TCK4 as well as to the control terminal of the gate TSS1. The varistor VS1 isolates ground through the operated contact of relay TSA2 and the gate TSS1 from the control circuitry of the gates TCK1–TCK4. When the circuit FF1 is reset, the control polential is removed from the gates TCK1–TCK4 reversing their condition so that the gates TCK2 and TCK4 are enabled and the gates TCK1 and TCK3 are disabled.

When the circuit FF1 is reset it provides a negative pulse to the gate-inverter I2 which, however, is disabled because its associated circuit FF2 is turned off. The pulse from the circuit FF1 does not function to operate the gate-inverter I2. It is for this reason that a gating potential at terminal G of the gate-inverters is required in addition to an input potential. The gating potential is really not a necessary feature during the selection sequence to insure the positive advance. The gating feature is, however, necessary when a reset pulse is provided to the chain to prevent the reset circuit from turning on its second succeeding circuit.

Returning now to the outpulsing sequence, the first pulse through gate TSR functions to reset the circuit FF1. The next timing pulse from the source 11 is provided through the gate TSR, the amplifier TSRA, the inhibiting gate TRI and the inhibiting gate TCK2 to set the flip-flop circuit TREF. When the circuit TREF is set, it provides a control potential to the terminals C of the inhibiting gate TRI and the enabling gate TRE. With the gate TRI inhibited and the gate TRE enabled, the next or third timing pulse from the source 11 is provided through the gate TSR, the amplifier TSRA, the enabling gate TRE, the inhibiting gate TCK4 and the amplifier TRA to the enabling gates RI0–RI9. As described above, the gate RI7 is enabled at this time but the gates RI0–RI6 and RI8–RI9 are disabled. The pulse through the read-in gate RI7 sets the flip-flop circuit FF7. The gate RI7 is enabled because its control terminal C is grounded through the operated contact of relay TSA2. The gates RI0–RI9 are normally disabled by the batteries B10–B19 connected respectively to their terminals C through the resistors R10–R19. The terminals C of gates RI0–RI9 are connected respectively to the grounded contacts of relays TSA9–TSA0 (the reverse order) to provide for the outpulsing of a number of pulses equal to the selected element number plus one.

It is evident that in order to obtain a proper number of outpulses it is necessary to set the flip-flop circuit, the number of which is 9 minus the element number. Thus, if trunk or element 9 is selected, stage S0 will be set in order to outpulse a total of ten pulses. If the element is element 0 the stage S9 is set in order to outpulse only one pulse.

When the circuit FF7 is set to indicate that three pulses are to be outpulsed, a control potential is provided once again to the gates TCK1–TCK4. The next pulse from the source 11 is provided through the gate TSR, the amplifier TSRA, the enabling gate TRE and the enabling gate TCK3 to set the flip-flop circuit TSK. When the circuit TSK is set, it enables the enabling gate TSKA in the outpulsing chain from the source 11. The outpulsing chain or path from the source 11 is through the gate OFLA, the enabling gate TSKA and the outpulsing amplifier OP to the gates CD0–CD9. The amplifier OP provides the pulses simultaneously to the input terminals of all ten gates CD0–CD9 and also to the output circuit 15. The control terminals C of the enabling gates CD0–CD9 are connected to the output terminals of their associated flip-flop circuits FF0–FF9. The only gate which is enabled, therefore, is the gate CD7 associated with the set flip-flop circuit FF7. All the other gates CD0–CD6 and CD8–CD9 are disabled as they are associated with reset or normal flip-flop circuits. The first pulse through the amplifier OP is therefore passed through the gate CD7 to the set terminal of the flip-flop circuit FF8. When the circuit FF8 is set by the first pulse from the amplifier OP, it enables its associated gate CD8 and it resets the circuit FF7. When the circuit FF7 is reset, it disables its associated gate CD7. The next pulse from the amplifier OP is provided through the enabling gate CD8 to the set terminal of the flip-flop circuit FF9. The circuits FF0–FF9 and their associated gates CD0–CD9 function in this manner as a shift register or counter advancing one position for each pulse through the amplifier OP until finally the flip-flop circuit OFL is set.

When the circuit OFL is set, it resets the circuit FF9 and it provides a disabling potential to the gate OFLA in the outpulsing path from the source 11. When the circuit OFL is set, it also operates the relay OFLR which connects the battery BT8 through the operated contact of relay TSA2 to the input circuit 10 to indicate that the outpulsing sequence is completed. For each advance of the shift register one pulse is provided from the amplifier OP to the output circuit 15. In the example being described with the selected element being the element 2, three pulses are provided to the circuit 15.

When the relay OFLR operates, it also initiates a reset cycle by connecting ground through the varistor FV to the amplifier TSRB. Normally the input to the amplifier TSRB is at a negative potential due to its connection through the resistor FR to the battery FB. The ground potential to the amplifier TSRB causes it to provide a positive reset potential to the circuits TREF, TSK, FF0–FF9 and OFL. Only the circuits OFL, TREF and TSK are set after the outpulsing sequence and they are reset by the pulse from the amplifier TSRB. When the circuits TREF and TSK are reset the gates TSKA, TRI, TRE are returned to normal and when the circuit OFL is reset, the gates OFLA and TCK1–TCK4 are returned to normal and the relay OFLR is released. When the relay OFLR is released, it removes the connection from the battery BT8 to the input circuit 10 and it opens the connection from ground through the varistor FB.

When the input circuit 10 receives the control signal from the battery BT8, it opens the contacts ST and 20 to return the selector circuit to normal. When contact 20 is opened, it opens the operating path for the relay VG0 causing it to release. When relay VG0 releases, it removes the control potential from gate TSS2 and it returns the translating networks 12 and 18 to normal. When the contacts ST are opened, the relay STA is released to in turn open the locking path for the relay TSA2 causing it to release. When the relay TSA2 releases, it in turn releases the relay TSAK and returns the gates TSR, RI7, TSS1 and B0–B9 to normal. The selector circuit is in this manner automatically returned to its normal condition ready for the initiation of another selection request for the input circuit 10.

It is to be understood that the above-described arrangements are illustrative of the application of the principles of this invention. Numerous other arrangements may be devised by those skilled in the art without departing from the spirit and scope of the invention. For example, the number of stages, or elements, considered for a selection request may readily be changed. Though the pulsed element identifying code is described as being a decimal code, other codes may be utilized. Once one of the relays TSA0–TSA9 is operated to identify the preferred available element, it may enable any combination of the gates RI0–RI9 instead of just one of them. The read-in pulse would therefore be applied to a combination of circuits FF0–FF9. Moreover, access to six selectable elements for a given selection request may be increased or decreased as desired. It is evident, therefore, that the above-described arrangements are merely illustrative of the application of the principles of this invention.

What is claimed is:

1. Apparatus for selecting an idle preferred one of a number of selectable elements comprising a plurality of trigger circuits, each of said trigger circuits having an operated and a normal condition, and means for interconnecting said trigger circuits in a chain including gating means for controlling the operation of each of said trigger circuits, predetermined ones of said gating means including means for preventing the operation of said controlled one of said trigger circuits unless the first preceding one of said trigger circuits is at said operated condition and the second preceding one of said trigger circuits is returning to said normal condition.

2. In combination, a plurality of bistable trigger circuits; a gate-inverter for each of said trigger circuits, each of said gate-inverters having an output terminal, a gating terminal and an input terminal; means connecting said trigger circuits and said inverters in a chain including means connecting said output terminal of each of said gate-inverters to said associated trigger circuit, means connecting said gating terminal of each of said gate-inverters to said trigger circuit first preceding said associated trigger circuit, and means connecting said input terminal of each of said gate-inverters to said trigger circuit second preceding said associated trigger circuit; and means effective upon the operation of any one of said trigger circuits for providing a reset potential to said trigger circuit first preceding said operated trigger circuit in said chain.

3. A positive advance selector comprising a plurality of bistable circuits, gating means connected to each of said circuits, means including said gating means interconnecting said circuits in a chain, means effective upon the operation of any one of said circuits except the first in said chain for resetting said circuit first preceding said operated circuit in said chain, means effective upon the operation of any one of said circuits for providing an enabling potential to said connected gating means, and means effective when one of said circuits is reset for providing an input potential to said gating means connected to said circuit first succeeding said reset circuit in said chain.

4. A positive advance selector comprising a plurality of two-state devices having a normal and an operated condition, gating means interconnecting said devices in a chain, means effective upon the operation of one of said devices except the first one in said chain for normalizing said device first preceding it in said chain, said gating means effective upon the normalizing of said first preceding device and responsive to said one of said devices for operating said device next succeeding said one of said devices in said chain, and means for selectively preventing the operation of said gating means.

5. A selector circuit for first establishing a selection preference for a number of selectable elements and then for generating a pulsed indication of the selection comprising a plurality of bistable circuits, first and second gating circuit means for each of said bistable circuits, means connecting said bistable circuits and said first gating means in a first chain, said first chain having a self-propagating operation, means connecting said bistable circuits and said second gating means in a second chain, said second chain having a step-by-step operation, circuit means for intiating the successive operation of said bistable circuits in said first chain, circuit means for controlling the conditions of said first gating means in accordance with the availability of the selectable elements whereby the operation of some of said bistable circuits is inhibited, means effective upon the operation of any one of said bistable circuits for resetting said bistable circuit first preceding it, means effective when any one of said bistable circuits is reset for operating said bistable circuit second succeeding it, and means effective after the operation of said first chain for disabling each of said first gating means and for providing pulses to said second gating means whereby said second chain is operated.

6. Apparatus for selecting an idle preferred one of a number of selectable elements comprising means for determining the availability for selection of each of said selectable elements, a plurality of trigger circuits, each of said trigger circuits having an operated and a normal condition, means for interconnecting said trigger circuits in a chain including gating means for controlling the operation of each of said trigger circuits, said gating means including means controlled by said determining means in accordance with the availability of said selectable elements for controlling the operation of said chain, predetermined ones of said gating means further including means for preventing the operation of said controlled one of said trigger circuits unless the first preceding one of said trigger circuits is at said operated condition and the second preceding one of said trigger circuits is returning to said normal condition.

7. A selector circuit for selecting an idle preferred one of a number of selectable elements in response to any one of a number of selection requests comprising means for indicating the availability of each of said selectable elements, means for establishing a different order of preference of said selectable elements for each of said selection requests, a self-propagating chain jointly controlled by said establishing means and by said indicating means for identifying the first available selectable element in an order of preference; and means controlled by said self-propagating chain for translating the determined preference order identity of said first available selectable element to an indication identifying said first available selectable element.

8. A selector circuit for selecting an idle preferred one of a number of selectable elements in response to any one of a number of different selection requests comprising means for indicating the availability for selection of each of said selectable elements, first means controlled in accordance with each of said selection requests for translating the selectable element identities to selection preference orders, a chain of bistable circuits having a self-propagating operation and controlled by said indicating means and by said first translating means for determining the preference order of the first available selectable element, means responsive to said one selection request for initiating the operation of said chain, and second means for translating said determined preference order identity of said first available selectable element back to the selectable element identity.

9. A selector circuit in accordance with claim 8 comprising in addition means controlled by said second translating means for registering the identity of said first available selectable elements, means effective upon the operation of said registering means for resetting said chain and for supplying thereto the identity of said first available selectable element, means effective after the operation of said resetting and supplying means for operating said chain as a pulse generator to supply a pulsed indication of said registered selectable element.

10. A flexible preference selector for establishing a different selection preference of a plurality of selectable elements for each of a number of selection requests comprising a plurality of bistable circuits, first and second gating circuit means for each of said bistable circuits, means connecting said bistable circuits and said first gating means in a first chain, means connecting said bistable circuits and said second gating means in a second chain, circuit means for initiating the successive operation of said bistable circuits in said first chain, means effective upon the operation of any one of said bistable circuits for resetting said bistable circuit first preceding it, means effective when any one of said bistable circuits is reset for operating said bistable circuit second succeeding it, means for determining the availabality for selection of each of said selectable elements, means controlled in accordance with the identity of the selection request for establishing a preference order for selecting some of said selectable elements, means jointly controlled by said determining means and by said establishing means for controlling the condition of said first gating means, and means effective after the operation of said first chain for disabling each of said first gating means and for providing pulses to said second gating means whereby said second chain is operated.

11. A flexible preference selector for establishing a different preference for selecting elements for each of a number of selection requests comprising a plurality of trigger circuits, gating means for each of said trigger circuits, means including said gating means for connecting said trigger circuits in a chain, means responsive to the initiation of a selection request for initiating the successive operation of said bistable circuits in said chain, means effective upon the operation of any one of said bistable circuits for resetting said bistable circuit first preceding it in said chain, means for registering the identity of the selection request, a translating network controlled in accordance with said registered request identity by said registering means for translating the identity of each of said elements to a preference order, means for determining the availability for selection of each of said elements, means controlled by said network and said availability determining means for providing a disabling potential to each of said gating means located in said chain in an order equal to the preference order of an available element, means effective after the initiation of a selection request for initiating the successive operation of said bistable circuit, and means for halting the successive operation of said bistable circuit, at said bistable circuit associated with the first disabled one of said gating means in said chain.

12. An apparatus for selecting a preferred one of a number of selectable elements comprising means for arranging preferred ones of said selectable elements in a preference order according to a selection request, a plurality of bistable circuits, means connecting some of said bistable circuits in a self-propagating chain, said connecting means including gating means responsive to said arranging means to limit the operation of said self-propagating chain according to a preferred one of said selectable elements, second gating means connecting said plurality of bistable circuits in a shift register chain, means responsive to said self-propagating chain for registering the identity of said preferred selectable element in said shift register chain, and means for operating said shift register chain whereby an indication of said preferred selectable element may be given.

13. An apparatus for selecting a preferred one of a number of selectable elements comprising means for arranging preferred ones of said selectable elements in a preference order according to a selection request, a plurality of bistable circuits, means connecting some of said bistable circuits in a self-propagating chain, said connecting means including gating means responsive to said arranging means to limit the operation of said self-propagating chain according to a preferred one of said selectable elements, some of said first gating means being jointly responsive to predetermined ones of said bistable circuits in said self-propagating chain, second gating means connecting said plurality of bistable circuits in a shift register chain, means responsive to said self-propagating chain for registering the identity of said preferred selectable element in said shift register chain, and means for operating said shift register chain whereby an indication of said preferred selectable element is given.

References Cited in the file of this patent

UNITED STATES PATENTS

| | | |
|---|---|---|
| 2,099,065 | Holden | Nov. 16, 1937 |
| 2,201,986 | Collis | May 28, 1940 |
| 2,486,712 | Harrison | Nov. 1, 1949 |
| 2,536,917 | Dickinson | Jan. 2, 1951 |
| 2,540,442 | Grosdoff | Feb. 6, 1951 |
| 2,559,702 | Bellamy | July 10, 1951 |
| 2,574,904 | Bellamy | Nov. 13, 1951 |
| 2,614,176 | Dimond | Oct. 14, 1952 |
| 2,686,838 | Dehn | Aug. 17, 1954 |
| 2,719,670 | Jacobs et al. | Oct. 4, 1955 |
| 2,840,708 | Sandiford | June 24, 1958 |